United States Patent [19]
Roginsky et al.

[11] Patent Number: 6,034,946
[45] Date of Patent: Mar. 7, 2000

[54] SELECTION OF ROUTING PATHS IN DATA COMMUNICATIONS NETWORKS TO SATISFY MULTIPLE REQUIREMENTS

[75] Inventors: Allen Roginsky, Durham; Raif Onvural; Vijay Srinivasan, both of Cary, all of N.C.

[73] Assignee: International Business Machines Corporation, Armonk, N.Y.

[21] Appl. No.: 08/834,310

[22] Filed: Apr. 15, 1997

[51] Int. Cl.$^7$ ............................ G01R 31/08; H04L 12/28
[52] U.S. Cl. ........................ 370/238; 370/229; 370/235; 370/351
[58] Field of Search .................................... 370/351, 352, 370/353, 354, 355, 356, 357, 229, 235, 238

[56] References Cited

U.S. PATENT DOCUMENTS

| | | | |
|---|---|---|---|
| 5,317,566 | 5/1994 | Joshi | 370/238 |
| 5,398,012 | 3/1995 | Derby | 370/351 |
| 5,850,385 | 12/1998 | Esaki | 370/216 |

OTHER PUBLICATIONS

T.E. Tedijanto, et al., NBBS Path Selection Framework, *IBM Systems Journal*, vol. 34, No. 4, 1995, p. 629.

Jean Yves Le Boudec and Tony Przygienda, A Route Pre–Computation Algorithm for Integrated Services Networks, *Journal of Network and Systems Management*, vol. 3, No. 4, 1995, p. 427.

Traffic Management Specification; The ATM Forum Technical Committee, Version 4.0, Apr. 1996.

*Primary Examiner*—Ajit Patel
*Assistant Examiner*—Ricardo M. Pizarro
*Attorney, Agent, or Firm*—Myers, Biegel Sibley & Sajovec; Jeanine S. Ray-Yarletts

[57] ABSTRACT

Methods, systems and computer program products which identify network routing paths having a first performance characteristic less than a first specified limit and a second performance characteristic less than a second specified limit from a plurality of routing paths. These routing paths are identified by combining both the first performance characteristic and the second performance characteristic for one of the plurality of routing paths to provide a third performance characteristic which differs from both the first and the second performance characteristic and which operates as a proxy for the first and second performance characteristic. It is then determined if the third performance characteristic of the routing path is less than a third performance limit associated with the third performance characteristic.

33 Claims, 6 Drawing Sheets

SELECTION OF ROUTING PATHS IN DATA COMMUNICATIONS NETWORKS TO SATISFY MULTIPLE REQUIREMENTS

FIELD OF THE INVENTION

The present invention generally relates to methods for selecting routing paths in a data communications network. More particularly, the present invention is directed towards techniques for identifying and selecting network routing paths which satisfy multiple separate delay requirements.

BACKGROUND OF THE INVENTION

Data communication networks refer to resources which interconnect and provide for communications between various computers, telephones, and other network users that are located at geographically separate locations. These networks can range from small networks interconnecting computers within a building to large distributed networks spanning countries or continents. Data communications networks are typically implemented where a large number of users interact or share resources, as such networks allow sharing of communications resources in a cost-effective manner.

Data communications networks are comprised of a group of switches, which are referred to as nodes, and a plurality of transmission links which interconnect the nodes. The nodes serve to provide users access to the network, and provide means for routing data transmitted across the network. The transmission links which interconnect these nodes carry the communications signals, and may comprise one or more different types of communications media such as wire, cable, radio, satellite or fiber optic communications links.

Networks provide for communications between users by transmitting data over one or more "transmission" or "routing" paths, which refer to the sequential series of nodes the data traverses in traveling from a source node to the destination node. These transmission paths connect the node at which the originator of the transmission request is located (i.e., the source node) to the node at which the recipient of the data is located (i.e., the destination node). Once such a path is established, part or all of the data is transmitted from the source node to the next node on the routing path via a transmission link, and thereafter retransmitted to additional intermediate nodes until the data ultimately reaches the destination node.

Data communications networks may operate via circuit-switching, packet-switching, or a combination of the two. In circuit-switched networks, a private transmission path is created through the network in response to a transmission request. This private path is held for the duration of the communication between the source node and the destination node, and other users are not allowed access to the resources comprising the routing path until after the entire communication has been completed. In packet-switched networks, blocks of data (data packets) are once again transferred from the source node to the destination node along a path in the network, but blocks of data which are part of the same communication need not always use the same path. Moreover, as a particular path in the network is not reserved for any particular communication, network users may share the same resources during the course of a single communication.

As communications resources are shared in packet switched networks, they are not always instantaneously available when a packet arrives at a particular intermediate node in the network. As such, data packets may be stored temporarily in buffers at intermediate nodes as they wait for transmission resources to the next node to become available. The time period during which a data packet is stored in buffers at an intermediate node is referred to as the queuing delay at the intermediate node. Moreover, since data packets comprising a single communication may be routed through the network via different paths, the packets comprising the communication may also experience different propagation delays. Because data packets may be subject to different propagation and queuing delays, it is possible that the data which comprises a single communication may not be received at the destination in the proper order. Consequently, resources may be required at the destination nodes for buffering and reordering received data packets so that the network provides the communication to the end user in the proper sequence.

The queuing and propagation delays associated with packet-switched networks can be problematic because certain types of communications signals, such as two-way voice communications, can only tolerate very short delays. In this situation, if the network cannot guarantee transmission of the communication within some minimum amount of time, the originating user will typically be given a "busy" signal. As such "busy" signals are undesirable, one of the primary goals of most networks is to efficiently assign transmission resources so as to minimize the number of times when the network is unable to guarantee transmission of a communication within the time period specified for that particular communication.

The maximum acceptable delay time specified for a particular communication may be expressed in a variety of different ways, such as in terms of the total delay, the difference in delay between the slowest and fastest blocks of data transmitted, or delay as a percentage of propagation time. Which criteria is specified depends on the types of communications transmitted across the network, as different delay parameters are important for different types of communications. Typically, all the users accessing a particular network specify their delay requirements in terms of a common delay criteria, and the network assigns resources in a manner that attempts to ensure that the delay requirements of each individual link are satisfied.

Most current networks use some form of "shortest path" routing to select routing paths in response to user communications requests. A general description of shortest path routing is given in Mischa Schwartz, *Telecommunication Networks: Protocols, Modeling and Analysis*, (1987) pp. 267–282. These shortest path routing algorithms attempt to either assign the "shortest path" to each transmission request (i.e., the path through the network resulting in the smallest delay), or, alternatively, simply attempt to ensure that each transmission request is assigned a path that has an associated delay less than the maximum delay specified for the transmission request. Current shortest path algorithms often take into account other parameters of the network, such as the bandwidth constraints of the various network transmission links, to optimize network performance.

By way of example, a reasonably sophisticated example of a "shortest path" path selection procedure is the procedure used in the Network Broadband Services ("NBBS") architecture, which is discussed in detail in Te Tedijanto, et al., NBBS Path Selection Framework, *IBM Systems Journal*, Vol. 34, No. 4, 1995, pp. 629–639. While the details of the NBBS path selection procedure are relatively complex, at its most basic level, the algorithm computes, for each number of hops h (where a "hop" is a single processing node in the network), the lowest delay from a source node s to each node in the network. This is accomplished, through an iterative process, by adding the delay values associated with each transmission link which serves to connect a particular node to its neighboring nodes to the (already computed) delay value associated with transmitting the signal from the source node to the appropriate neighboring node. These sums are then compared to identify the path which results in the lowest delay to the particular node in question. Thus, for instance, if the delay requirement is the total delay (which comprises the propagation delay added to the queuing delay), then for each transmission link i which connects node x to a neighboring node, the propagation delay and queuing delay for link i is added to the previously calculated total delay associated with transmitting a signal to the neighboring node. In this manner, the total delays to node x associated with routing a signal through each node neighboring node x are computed, and the lowest of these values is the total delay to node x.

Shortest path routing algorithms are designed to ensure that a single "cost" criteria, such as the total delay or the variable delay, is minimized or satisfied. As such, these algorithms are not suitable for identifying routing paths which satisfy two or more "cost" criteria. This may be problematic, because in transmitting certain types of data it may be necessary to ensure that more than one of the different delay parameters is held below some maximum value.

By way of example, with voice communications, the relevant delay parameter is typically the total delay, as the goal is to provide a two-way communications link which does not have a noticeable transmission delay. However, when transmitting broadband video signals, the total delay is often irrelevant (since these are primarily one-way, not two-way, communications), but the queuing delay may be very important as only limited buffering is typically available. Accordingly, for applications that combine voice and video communications signals (e.g., video-teleconferencing), current network optimization algorithms are less than ideal as they typically are unable to ensure that both the criteria for voice and video are satisfied.

One potential method of identifying routing paths that satisfy multiple delay requirements is to calculate each of the multiple delays associated with every communication path in the network. While such an approach would identify any suitable paths, the computing resources and time required to perform such computations are prohibitively high in practical networks, as the computations required grows exponentionally with the size of the network. As such, networks faced with this problem have instead sought to combine the multiple criteria into a single, restrictive criteria. However, use of this more restrictive criteria leads to unsatisfactory results in actual operation, as often no path exists which satisfy the more restrictive criteria.

By way of example, when a video-teleconferencing signal is communicated across a network it may be necessary to ensure that the total delay is less than a first specified limit ($c_1$) and that the queuing delay (Q) is less than a second specified limit ($c_2$). The total delay is comprised of the propagation delay (P) and the queuing delay. Thus, the delay criterion can be described mathematically as:

$$P+Q \leq c_1 \quad (1a)$$

$$Q \leq c_2 \quad (1b)$$

One way of ensuring that the criteria of Equations (1a) and (1b) are satisfied is to find a network routing path which satisfies the more restrictive criteria of $P+Q \leq c_2$. However, such an approach imposes an artificially strict delay requirement (as $c_2$ is typically much smaller than $c_1$), and as such, in most practical networks there is rarely a path which satisfies the $P+Q \leq c_2$ delay criteria. This is particularly true in geographically dispersed networks, because $c_2$ (which is driven by buffering resources) will often be smaller than the minimum possible propagation delay, thereby guaranteeing that no path can exist which will satisfy $P+Q \leq c_2$. For example, in the case of a real-time connection across the continental United States, the propagation delay (P) is on the order of 20 milliseconds, while the maximum queuing delay (Q) may be limited to 3–5 milliseconds. In such a case, it is theoretically impossible to find a path where $P+Q \leq c_2$ since P is greater than $c_2$. Accordingly, using the combined criteria is typically not an acceptable solution to the problem of identifying network routing paths that meet two separate delay requirements.

Various standard committees, including the International Union of Telecommunications and the ATM Forum have recognized the need for path selection algorithms that guarantee that a network path is provided that satisfies two separate criteria. However, despite the recognized need for network path selection algorithms that account for multiple delay requirements, prior solutions may be either impractical or ineffective at selecting paths which satisfy two or more separate requirements. As such, there exists a need for improvement in the algorithms used to select routing paths through networks. More specifically, a need exists for new methods of determining paths which satisfy multiple delay requirements, that may be carried out by existing network computing resources, and which are capable of identifying acceptable routing paths most of the time in realistic networks.

SUMMARY OF THE INVENTION

In view of the above limitations associated with existing methods of selecting network routing paths, it is an object of the present invention to provide methods, systems and computer program products for identifying routing paths in data communications networks that satisfy two or more separate performance requirements.

Another object of the present invention is to provide methods and systems for identifying and selecting network routing paths that satisfy multiple performance requirements which can be performed using the computer resources available in existing networks.

It is still a further object of the present invention to provide methods and systems which increase the likelihood that a network routing path that meets multiple delay requirements can be identified (if such paths exist). Other objects, features and advantages of the present invention will become apparent upon reading the following detailed description and appended claims and upon reference to the accompanying drawings.

The above-mentioned objects of the present invention are provided by methods, systems and computer program products which identify network routing paths having a first performance characteristic less than a first specified limit and a second performance characteristic less than a second specified limit from a plurality of routing paths. These routing paths are identified by combining both the first performance characteristic and the second performance characteristic for one of the plurality of routing paths to provide a third performance characteristic which differs from both the first and the second performance characteristic and which operates as a proxy for the first and second performance characteristic. It is then determined if the third performance characteristic of the routing path is less than a third performance limit associated with the third performance characteristic.

In a further embodiment of the present invention the third performance characteristic is selected such that a routing path having a third performance characteristic less than the limit for the third performance characteristic will also have a first performance characteristic less than the first specified limit and a second performance characteristic less than the second specified limit.

In a particular embodiment of the present invention the first performance characteristic comprises a first delay characteristic and the second performance characteristic comprises a second delay characteristic.

In another aspect of the present invention, network routing paths are selected from a plurality of routing paths by calculating the cost associated with each transmission link included in one of the routing paths, determining the total cost associated with that routing path as the sum of the costs associated with each such transmission link, and selecting the routing path if its total cost is less than a specified cost limit. In one embodiment of this aspect of the invention, the cost associated with each transmission link is calculated as the product of a first specified limit and a second variable associated with the transmission link added to the product of a second specified limit and a first variable associated with the transmission link, and the specified cost limit is defined as the product of the first specified limit and the second specified limit.

In another embodiment of this aspect of the invention which is particularly suited for constant bit rate communications, the cost associated with each transmission link is calculated as twice the product of a first specified limit and the second variable associated with the transmission link added to the product of the first variable associated with the transmission link with the sum of the first specified limit and a second specified limit, and the specified cost limit is defined as the square of the first specified limit added to the product of the first specified limit and the second specified limit. An embodiment is also disclosed herein that may be used when the minimum propagation delay between the source node and the destination node is known. In this embodiment, the cost associated with each transmission link is calculated as the product of the second variable associated with the transmission link with the difference between the first specified limit and a specified value added to the product of the first variable associated with the transmission link with $x_0$, where $x_0$ is the product of the sum of the first specified limit and the second specified limit with the difference of the first specified limit and the specified value divided by twice the first specified limit. In this embodiment, the specified cost limit is defined as the product of the first specified limit and $x_0$. In each of the above embodiments of the present invention, the total cost associated with a routing path may be determined via the Network Broadband Services architecture path selection methodology.

In the various embodiments of the present invention, the first variable associated with a transmission link may be defined as the propagation delay on that link, and the second variable associated with the link may be defined as the queuing delay on that link. Similarly, the first specified limit may be defined as the maximum allowable value for the total transmission delay on the routing path, and the second specified limit may be defined as the maximum allowable value for the queuing delay. The specified value may be defined as any positive number less than the minimum propagation delay. As will be appreciated by those of skill in the art, the present invention may be embodied as a method, apparatus or computer program product.

Through use of the above methods, systems and computer program products, network routing paths may be efficiently identified which satisfy two or more separate delay requirements. These methods and systems in part capitalize on the realization that various different delay criteria which include only a single parameter may be identified such that in the event a path is found that satisfies this criteria, it is guaranteed that the path will also satisfy two or more other delay requirements.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by those of skill in the art, the present invention may be embodied as methods or devices. Accordingly, the present invention may take the form of an entirely hardware embodiment, an entirely software embodiment or an embodiment combining software and hardware aspects The present invention provides methods, systems and computer program products for selecting routing paths in a data communications network. In a preferred embodiment, these methods, systems and computer program products select network routing paths which have delay characteristics that-satisfy at least two separate delay requirements that are associated with the data which is to be transmitted across the network.

Figure 1:
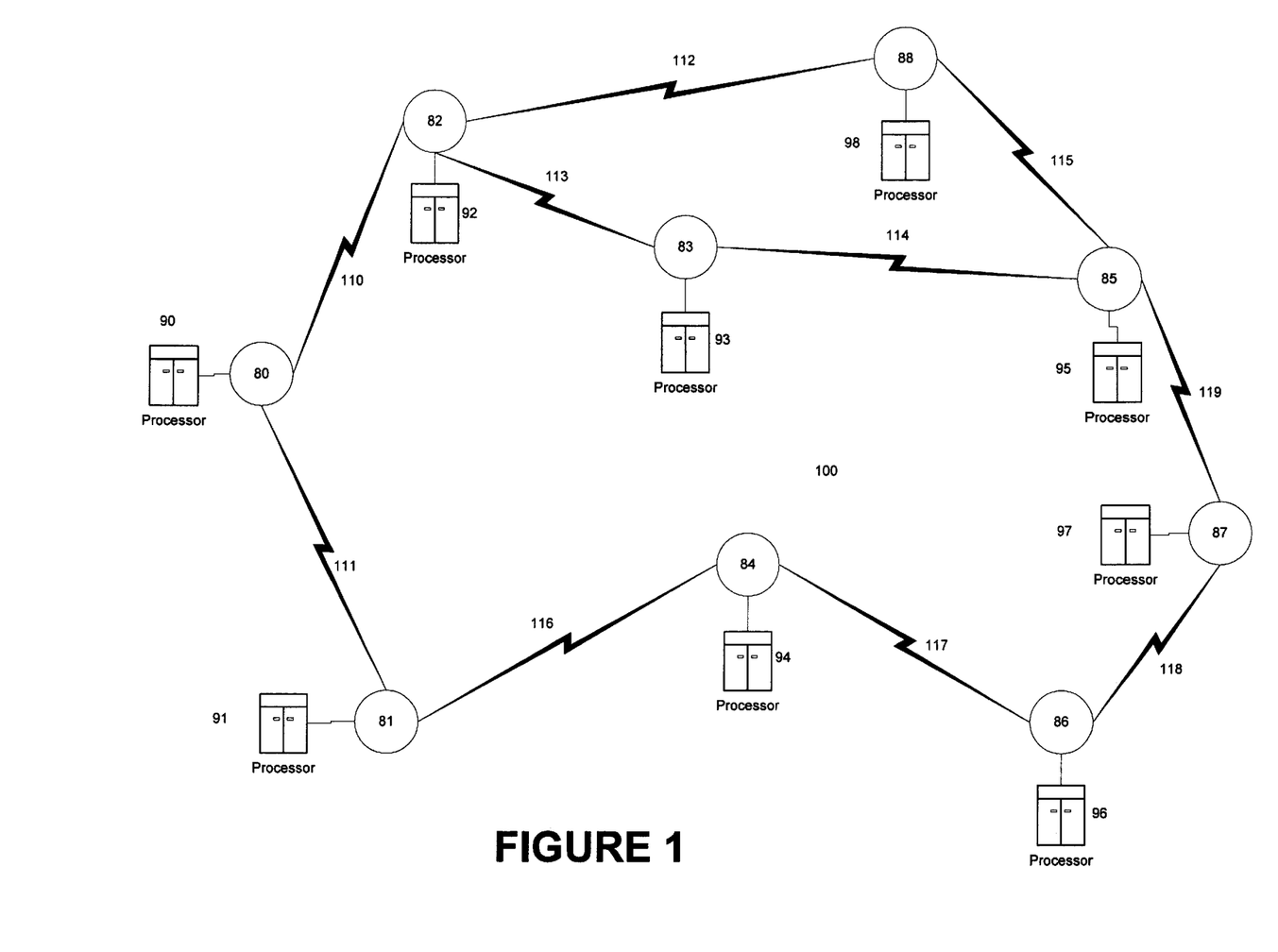
FIG. 1 illustrates a system for carrying out the methods of the present invention.

A system which may be utilized in carrying out the present invention is illustrated in FIG. 1. In the example shown in the figure, the system comprises network control resources 90, 91, 92, 93, 94, 95, 96, 97 which are provided at each node of a data communications network 100. This network 100 also includes a plurality of nodes 80, 81, 82, 83, 84, 85, 86, 87 which are interconnected by transmission links 110, 111, 112, 113, 114, 115, 116, 117, 118, 119. Each of these transmission links has various associated delay attributes, such as a propagation delay and a maximum queuing delay. In the system illustrated in FIG. 1, control of the network, which includes assigning routing paths in response to transmission requests by the various users, may be maintained primarily from one of a limited number of centralized locations, such as network control resource 95 located at node 85, or alternatively may be distributed throughout the network such that most or all of the network control resources 90, 91, 92, 93, 94, 95, 96, 97 perform significant control functions.

Network control resources 90, 91, 92, 93, 94, 95, 96, 97 may comprise a variety of different computer hardware such as processors, buffers, switches and the like. These resources also typically include associated software for controlling the hardware, processing transmission requests, determining routing assignments and controlling the network. Via this hardware, software, or a combination thereof, the system of FIG. 1 may be used in carrying out the present invention described herein.

The present invention will now be described with respect to FIG. 2 and FIG. 3 which are flowcharts illustrating the operation of a processing system, such as the system of FIG. 1. It will be understood that each block in these flowcharts, and combinations of blocks in these flowcharts, can be implemented by computer program instructions. These program instructions may be provided to a processor such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 2:
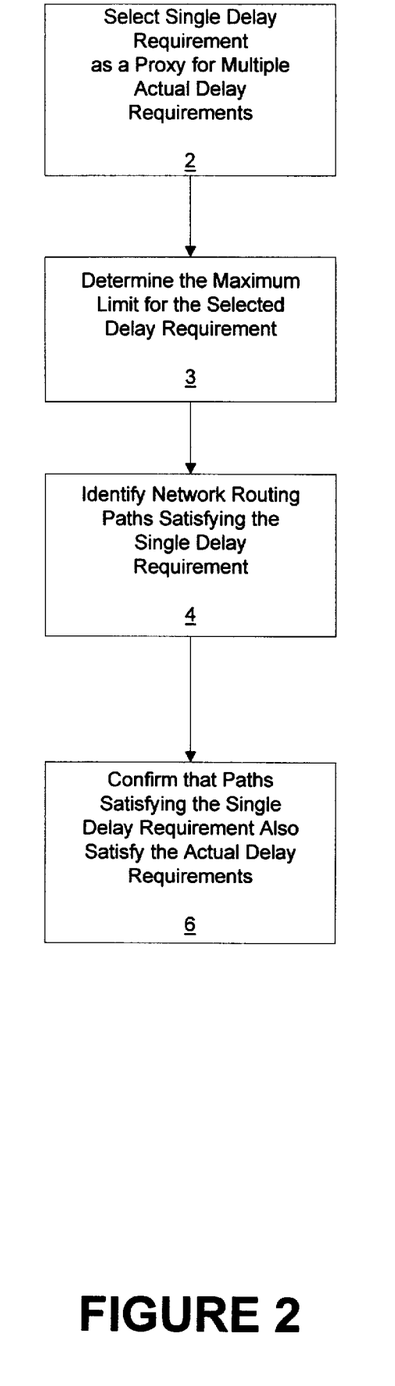
FIG. 2 is a flow chart over viewing the present invention.

FIG. 2 illustrates one embodiment of the present invention that identifies network routing paths that satisfy multiple performance requirements. As illustrated in FIG. 2, two or more performance requirements, such as delay requirements, which are associated with a particular transmission request are replaced (block 2) with a single performance requirement that serves as a proxy, or approximation, for the actual performance requirements. This replacement performance requirement, and its associated maximum value or "limit," are preferably chosen 2, 3 to closely approximate the two or more actual performance requirements. In a preferred aspect of the present invention, the replacement performance requirement is also selected so that any routing path satisfying the replacement requirement will also be guaranteed to satisfy the actual performance requirements.

Once an alternative performance criteria has been selected, routing paths are then identified (block 4) which satisfy this performance requirement. This may be done by a variety of techniques such as by modifying any of a variety of existing shortest path algorithms that are well known to those of skill in the art to identify routing paths based on the replacement performance requirement. Additionally, it may also be desirable to confirm (block 6) that the identified paths (if any) do in fact satisfy the actual performance requirements. However, this verification may not be necessary, as in the instance when the performance requirement selected as a proxy is chosen such that any routing paths that satisfy it will by definition also satisfy the actual performance requirements.

In a specific embodiment of the present invention, methods for efficiently identifying network routing paths that satisfy specific limits on the maximum total delay and the maximum queuing delay are provided. As is understood by those of skill in the art, the total delay of a network routing path refers to the sum of the propagation delay and the maximum queuing delay associated with that path. Mathematically, these limits on the total delay and queuing delay may be expressed as:

$$\text{Total Delay} = P + Q \leq c_1 \tag{2a}$$

$$\text{Queuing Delay} = Q \leq c_2 \tag{2b}$$

where:

P=the path propagation delay;

Q=the maximum possible path queuing delay;

$c_1$=the limit on the total delay; and $c_2$=the limit on the queuing delay.

Figure 3:
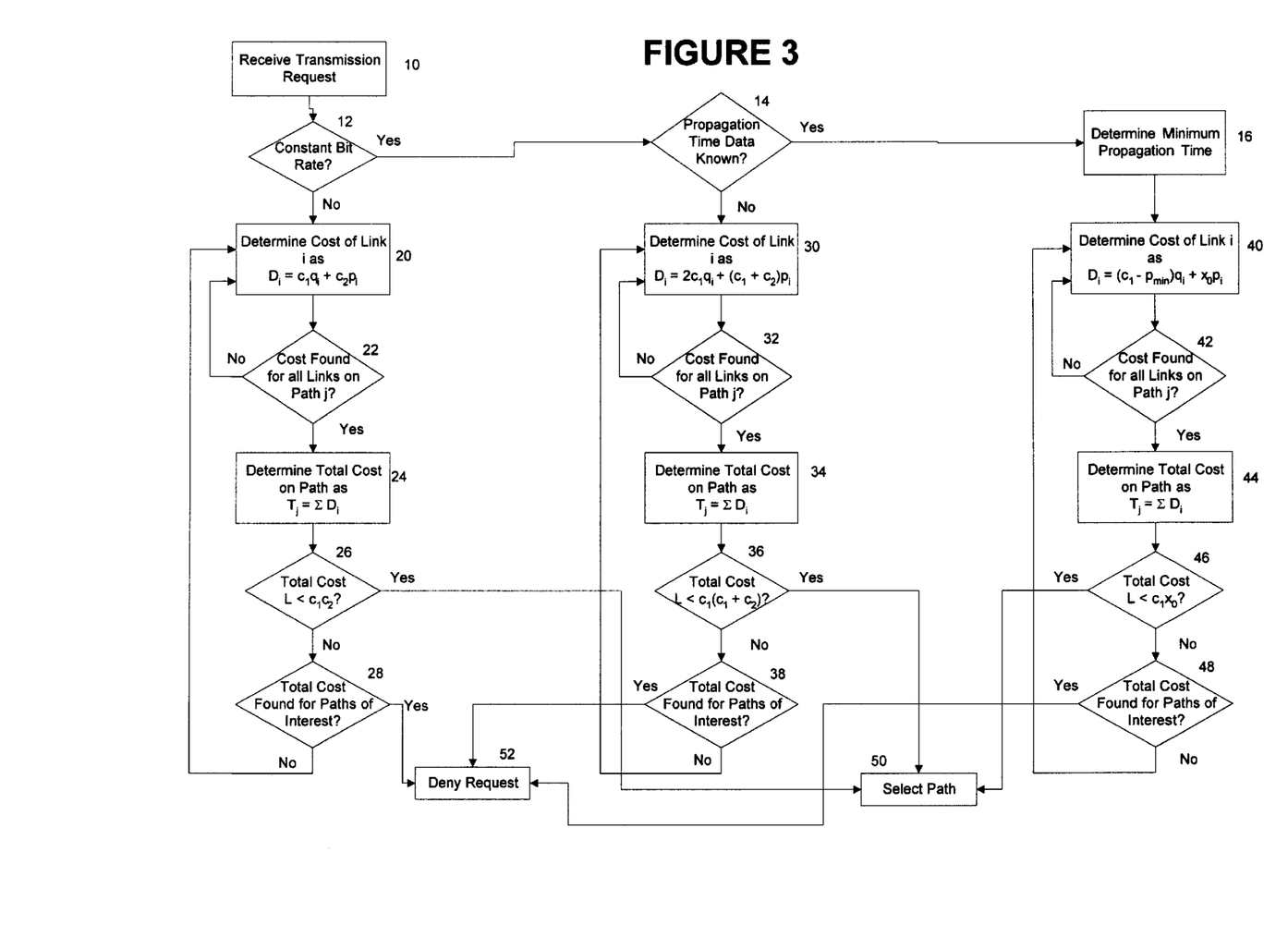
FIG. 3 is a flow chart describing the methods of the present invention.

The identification of routing paths which satisfy Equations (2a) and (2b) according to various embodiments of the present invention is illustrated in FIG. 3. As shown in FIG. 3, upon receipt of a data transmission request (block 10) a network controller 95 determines if the signal to be transmitted is a constant bit rate signal or a variable bit rate signal (block 12). If the signal is a variable bit rate signal, the network controller identifies network routing paths which have an associated "cost" (which serves as a proxy for the total delay and the queuing delay) that is less than or equal to some maximum specified value. This is accomplished by determining the cost associated with each link in a potential network routing path (block 20 and block 22) and, using these cost values, determining the total cost associated with the routing path (block 24). This total cost is then compared to the maximum allowable cost permitted for the signal which is to be transmitted (block 26). This process is repeated until the total cost has been computed and compared to the maximum allowable cost for some or all of the paths over which the data could be transmitted across the network (block 28) or until a path satisfying the criteria is located (block 26). In this first embodiment of the present invention, the cost associated with each link (block 20) is determined a $C_1 q_i + C_2 p_i$ where $q_i$ and $p_i$ are the queuing and propagation delays of the $i^{th}$ link. These link values are summed (block 24) to determine the total cost for a path and that total cost is compared to $C_1 C_2$.

If the signal to be transmitted is a constant bit rate signal, then, the network controller determines if propagation time data is available (block 14). If propagation time data is not available, the cost associated with each link in a potential network routing path (block 30 and block 32) is again determined and, using these cost values, the total cost associated with the routing path (block 34) is determined. This total cost is then compared to the maximum allowable cost permitted for the signal which is to be transmitted (block 36). This process is repeated until the total cost has been computed and compared to the maximum allowable cost for some or all of the paths over which the data could be transmitted across the network (block 38) or until a path satisfying the criteria is located (block 36). In this second embodiment of the present invention, the cost associated with each link (block 30) is determined by $2C_1q_i+(C_1+C_2)p_i$ where $q_i$ and $p_i$ are the queuing and propagation delays of the $i^{th}$ link. These link values are summed (block 34) to determine the total cost for a path and that total cost is compared to $C_1(C_1+C_2)$ If the signal to be transmitted is a constant bit rate signal and propagation time data is available, the cost associated with each link in a potential network routing path (block 40 and block 42) is again determined and, using these cost values, the total cost associated with the routing path (block 44) is determined. This total cost is then compared to the maximum allowable cost permitted for the signal which is to be transmitted (block 46). This process is repeated until the total cost has been computed and compared to the maximum allowable cost for some or all of the paths over which the data could be transmitted across the network (block 48) or until a path satisfying the criteria is located (block 46). In this third embodiment of the present invention, the cost associated with each link (block 40) is determined by $(c_1-p_{min})q_i+x_0p_i$ where $q_i$ and $p_i$ are the queuing and propagation delays of the $i^{th}$ link, $p_{min}$ is the minimum propagation delay and $x_0=(c_1+c_2)(c_1-p_{min})/2c_1$. These link values are summed (block 34) to determine the total cost for a path and that total cost is compared to $C_1x_0$.

As is indicated in FIG. 3, after the total cost associated with a potential routing path has been determined (block 24, block 34 or block 44), that cost is compared to a specified cost limit (block 26, block 36 or block 46). If the cost of the routing path is less than (or equal to) the specified limit, then the routing path is identified as an acceptable path and the communications resources on one such acceptable routing path will be assigned to the user for transmission of the data over the network (block 50). If no routing path has a cost less than the specified limit, then a path which satisfies the dual delay requirements has not been identified. In this situation, the network controller 95 may deny the communications request (block 52), assign the request to a routing path which may not satisfy the actual delay requirements, or employ more sophisticated methods (if processing means are available) to identify if a path which satisfies the dual delay requirements does in fact exist but was not identified.

As shown in FIG. 3, in the first embodiment of the present invention, the cost ($D_i$) associated with individual transmission links is calculated as:

$$D_i=c_1q_i+c_2p_i \qquad (3)$$

where:

$p_i$=the propagation delay on link i; and $q_i$=the queuing delay on link i.

As illustrated in FIG. 3, these individual transmission link costs are used to determine the total cost ($T_j$) associated with particular network routing paths, where the total cost of a particular path is the sum of the costs ($D_i$) of its constituent transmission links. These total costs are then compared 26 to the maximum limit on the delay cost (L), which in this particular embodiment, is calculated as the product of $c_1$ and $c_2$. This first embodiment of the present invention may be used to identify acceptable routing paths for variable bit rate traffic or constant bit rate traffic.

As shown below, any network routing path identified as having a total cost ($T_j$) which is less than the product $c_1c_2$, is guaranteed to satisfy the dual delay requirements of Equations (2a) and (2b). However, the methodology does not guarantee that such a routing path will in fact be identified, as (i) there may not be any network routing path that satisfies the dual delay requirements or (ii) while a routing path that satisfies the dual delay requirements exists, its total cost may exceed the product $c_1c_2$. This latter event may occur because the single delay requirement that is used in the methodology as a proxy for the dual delay requirements is only an approximation, and hence routing paths which in fact satisfy the dual delay criteria may not satisfy the single criteria.

Figure 4:
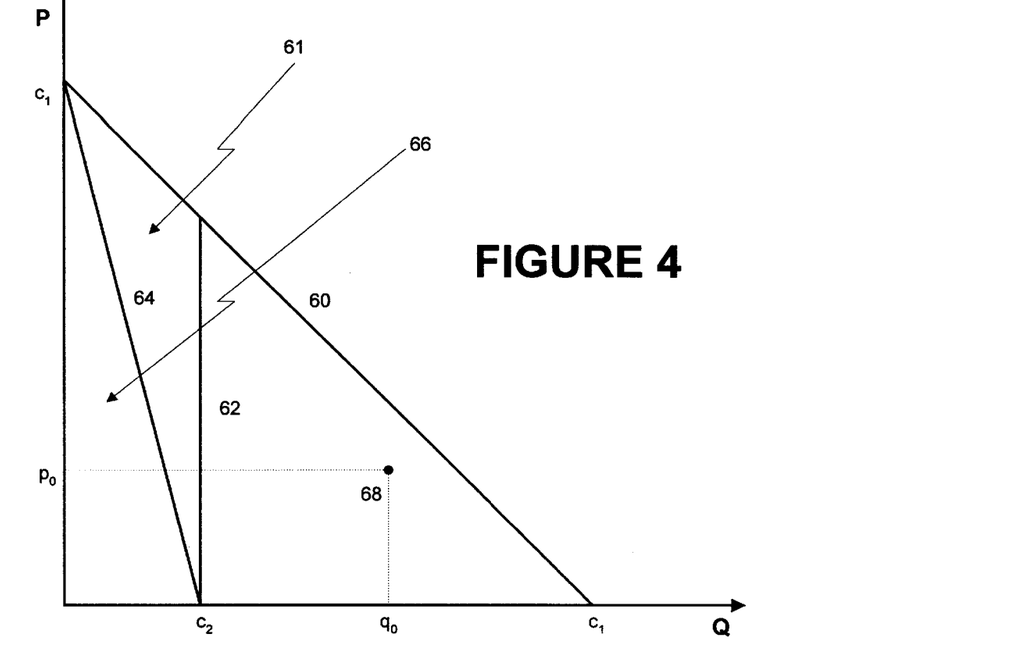
FIG. 4 is a graphical representation of the propagation delay versus the queuing delay illustrating the region where paths which satisfy certain dual-delay requirements will fall.

The relationship between the actual dual delay requirements of Equations (2a) and (2b) and the approximation for those criteria used in the first embodiment of the present invention is illustrated in the graph of FIG. 4. The graph of FIG. 4 describes network routing paths in terms of their total propagation delay (P) and their total maximum queuing delay (Q). As both a propagation and (maximum) queuing delay are associated with each routing path in the network, FIG. 4 provides a means for graphically comparing the characteristics of different network routing paths which are each represented by a point on the graph as illustrated by point 68.

Also plotted on the graph of FIG. 4 are several lines, including line 60, which represents Equation (2a), and line 62, which represents Equation (2b). As Equations (2a) and (2b) are inequalities, network routing paths which satisfy both the total delay requirement ($c_1$) and the queuing delay requirement ($c_2$) will plot within the trapezoidal area 61 defined by line 60, line 62 and the P and Q axes. Also shown on the graph of FIG. 4 is line 64, which connects the points $(0,c_1)$ and $(c_2,0)$. This line 64 and the Q-axis and P-axis create a triangle 66, that lies entirely within the trapezoidal region 61 of the graph where routing paths that meet both delay requirements must fall.

As both $c_1$ and $c_2$ are positive (it is theoretically impossible to have a propagation delay or a queuing delay which is less than zero), the area falling within triangle 66 may be described mathematically as:

$$c_1Q+c_2P \leq c_1c_2 \qquad (4)$$

Thus, triangle 66 represents the area where paths which meet the requirement of Equation (4) may fall. As FIG. 4 illustrates, every path which falls in triangle 66 will also fall within trapezoid 61. Therefore, any path which satisfies the inequality of Equation (4) will also satisfy the dual delay requirements of Equations (2a) and (2b). Accordingly, pursuant to the teachings of the present invention it is understood that the "delay" requirement of Equation (4) may serve as a proxy for the dual delay requirements of Equations (2a) and (2b).

FIG. 4 is also illustrative of one method of selecting a delay requirement to serve as a proxy for other delay requirements, as shown at block 2 in FIG. 2. As seen in FIG. 4, the trapezoidal area defined by the lines 60 and 62 may be conveniently approximated by a third line 64 which is drawn to cover as much of the trapezoid as possible without leaving the boundaries of the trapezoid in the relevant quadrant of the Q-P graph. Accordingly, a possible proxy for the dual delay requirements in this case is line 64, which is mathematically described by the single "cost" criteria of Equation (4).

As will be understood by those of skill in the art, any conventional "shortest path" routing technique may be modified to utilize the cost evaluation and proxies of the present invention. As such, it should be understood that the present invention is not limited to any particular path selection technique, as any number of conventional techniques may be used to carry out the present invention simply by modifying the "cost" value which is attributed to each transmission link in the network and by calculating a maximum cost that appropriately measures the multiple delay requirements which are at issue.

Additionally, while the flow chart of FIG. 3 illustrates an embodiment of the present invention where the delay costs ($D_i$) and total delay ($T_j$) values associated with each particular routing path are calculated one after another, it will be understood by those of skill in the art that these values need not be computed in that order. In fact, it will be understood that in most traditional "shortest path" routing schemes these values are not computed in the order illustrated in FIG. 3 but instead are computed in an order that serves to minimize the number of calculations performed in determining the optimum routing paths. Accordingly, the present invention should not be construed as being limited to the embodiment disclosed in FIG. 3, but instead is consistent with the scope of the claims appended hereto.

It will further be understood by those of skill in the art that the present invention may easily be implemented in existing networks, as the present invention can perhaps most efficiently be implemented through modification of the shortest path selection techniques that are already used in most networks. Accordingly, the present invention requires little, and in some cases no, increase in complexity over existing route selection techniques, but provides the ability to identify and select paths that satisfy multiple delay requirements.

As is also illustrated in FIG. 4, the area encompassed by triangle 66 includes many points which are far from the origin of the graph. This is significant, because routing paths are more likely to exist the farther you move from the origin. It is estimated that in the vast majority of real-life network applications, routing paths which fall within triangle 66 will exist. Accordingly, although the first embodiment of the present invention does not guarantee that an acceptable routing path will be identified, it is anticipated that in most cases a path will be identified.

While use of the delay criterion of Equation (4) may be sufficient to identify network routing paths that meet both delay requirements of Equations (2a) and (2b), FIG. 4 also illustrates that an acceptable routing path may exist which is not identified by such an algorithm. Such is the case where one or more paths exist which fall inside the trapezoidal region 61 of FIG. 4 yet outside triangle 66. However, pursuant to an additional aspect of the present invention, a further improvement may be gained if it is known that the data to be communicated has a constant bit rate. The improved performance of this second embodiment of the invention may often be utilized because a large percentage of all network data communications traffic comprises constant bit rate traffic, and more significantly, it is typically only with respect to constant bit rate traffic that a requirement on the queuing delay is ever imposed. Accordingly, in many situations where there are dual delay requirements, it will be the case that the communications signals comprise constant bit rate traffic.

Figure 5:
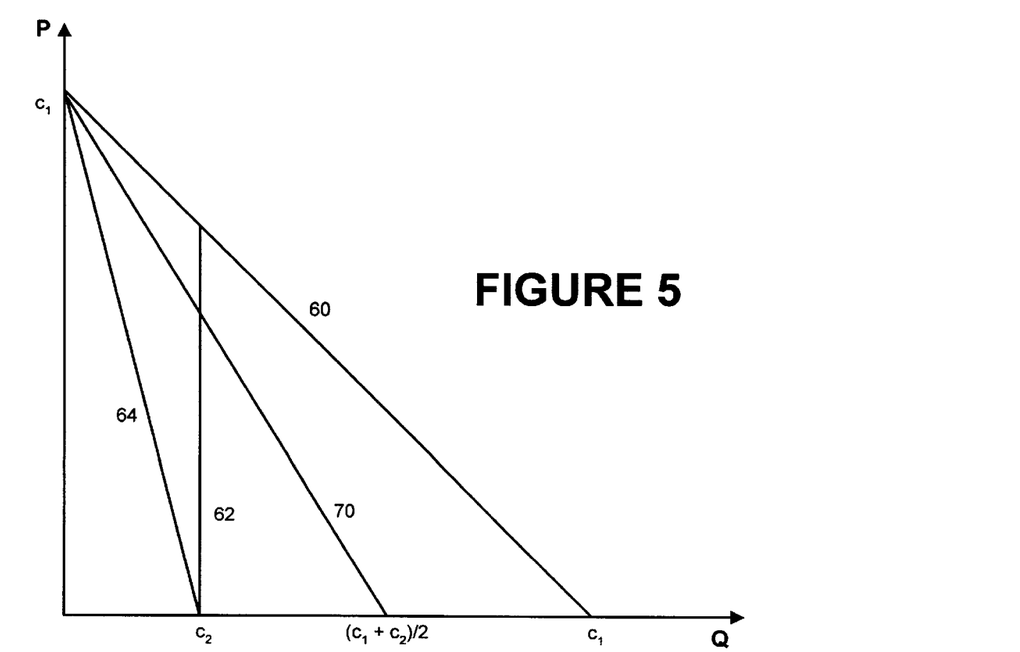
FIG. 5 is a graphical representation of the propagation delay versus the queuing delay which illustrates the improvement in path identification which can be achieved if it is known that the communications signal has a constant bit rate.

The second embodiment of the present invention is also illustrated in FIG. 3. As illustrated in the figure, with constant bit rate traffic, each links contribution to the overall delay cost is calculated as $2c_1 q_i + (c_1 + c_2) p_i$ (block 30), and the total delay for a particular routing path is computed (block 34) and compared to the value $(c_1 + c_2) c_1$ (block 36). FIG. 5 illustrates the region in which paths which satisfy the dual delay requirements of Equations (2a) and (2b) will be identified pursuant to this second embodiment (the area falling below line 70). Typically a large number of additional paths are encompassed in the additional region of FIG. 5 which are not encompassed by triangle 66 in FIG. 4.

In using the second embodiment of the present invention, a buffer 120 is preferably available at the destination node which can store a portion of the received signal. As shown below, this buffer 120, which stores up to $\lambda$ seconds of data, can be used to reduce the queuing delay by $\lambda$ seconds, and hence allow for queuing delays which are up to $\lambda$ seconds larger than $c_2$. Such a buffer, however, increases the total delay by $\lambda$ seconds as well. Thus, the second embodiment of the present invention permits identification of acceptable paths which have larger queuing delays than the paths identified by the first embodiment, but will not find other paths (which have total delays greater than $c_1 - \lambda$) which meet both delay requirements which would be identified by the first embodiment of the present invention. As the methodologies are directed to different, overlapping, regions of the Q-P graph, optimum performance may be obtained by performing both methodologies when searching for acceptable routing paths.

The routing paths which are selected by the second embodiment of the present invention are paths where:

$$P+Q \leq r_1, \text{ and} \tag{5a}$$

$$Q \leq r_2 \tag{5b}$$

where:

$$r_1 + r_2 \leq c_1 + c_2, \text{ and}$$

$$r_2 > c_2$$

A routing path meeting the criteria of Equations (5a) and (5b) will not necessarily meet the dual delay requirements of Equations (2a) and (2b). However, assuming that an output buffer 120 of duration $\lambda$ seconds is provided, where $0 \leq \lambda \leq r_2$, it is possible to achieve the following conditions on any path which satisfies Equations (5a) and (5b):

$$\text{Total Delay} \leq r_1 + \lambda, \text{ and} \tag{6a}$$

$$\text{Queuing Delay} \leq r_2 - \lambda \tag{6b}$$

To understand why the conditions of Equations (6a) and (6b) may be achieved by the provision of a buffer 120, it is helpful to define the following:

$R_n$=time the $n^{th}$ data cell was sent;

$a_n$=time the $n^{th}$ data cell arrives at the buffer;

$t_n$=time the $n^{th}$ cell leaves the buffer;

$K_n$=time period elapsing after the first cell was sent and before the $n^{th}$ cell was sent;

P=propagation delay on the routing path;

$Q_n$=queuing delay experienced by the $n^{th}$ data cell;

$d_n$=total delay experienced by the $n^{th}$ data cell;

$d_n'$=total delay experienced by the $n^{th}$ data cell including the time spent in the buffer;

Based on the above definitions:

$$a_n = R_n + d_n \tag{7}$$

$$d_n' = t_n - R_n \tag{8}$$

$$K_n = R_n - R_1 \tag{9}$$

$$t_n = a_n + \lambda \tag{10}$$

Moreover, as the size ($\lambda$) of the output buffer 120 can be chosen, $t_n$ may also be set as:

$$t_n = \max(a_n, a_1 + K_n + \lambda) \quad (11)$$

By setting $t_n$ to this value the $n^{th}$ cell is guaranteed to be ready when it is time to release the $n^{th}$ cell from the buffer 120.

To see that Equation (6a) is satisfied, note that in the case where $t_n = a_n$, $\lambda = 0$ (see Equation (10)), and thus:

$$\text{Total Delay} = P + Q \quad (12)$$

Substituting Equation (5a) into Equation (12):

$$\text{Total Delay} \leq r_1 \quad (13)$$

In the case where $t_n = (a_1 + K_n + \lambda)$, then Equations (7), (8) and (11) may be combined to show:

$$d'_n = R_1 + d_1 + K_n + \lambda - R_n = d_1 + \lambda \leq r_1 + \lambda. \quad (14)$$

However, $d'_n$ is the total delay, so Equation (14) can be rewritten as:

$$\text{Total Delay} \leq r_1 + \lambda. \quad (15)$$

Thus, Equations (13) and (15) demonstrate that provision of the output buffer 120 guarantees that the condition of Equation (6a) is satisfied.

To see that Equation (6b) will also be satisfied, first note that by combining Equations (7) and (9), Equation (11) may be rewritten as:

$$\begin{aligned} t_n &= \max(R_n + d_n, R_1 + d_1 + K_n + \lambda) \\ &= \max(R_n + d_n, R_n + d_1 + \lambda) \\ &= R_n + \max(d_n, d_1 + \lambda) \end{aligned} \quad (16)$$

Substituting Equation (16) into Equation (8), results in:

$$d'_n = \max(d_n, d_1 + \lambda) \quad (17)$$

If $d_1 + \lambda > d_n$, then:

$$d'_n = d_1 + \lambda = P + q_1 + \lambda \leq P + q_1 + r_2 \quad (18a)$$

If $d_1 + \lambda < d_n$, then:

$$d'_n = d_n = P + q_n \leq P + q_1 + r_2 \quad (18b)$$

Thus, Equations (18a) and (18b) show that:

$$d'_n \leq P + q_1 + r_2 \quad (19)$$

From Equation (14) above, note that:

$$d'_n = d_1 + \lambda \quad (20)$$

This may be rewritten as:

$$d'_n = q_1 + P + \lambda \quad (21)$$

Combining Equations (19) and (21):

$$q_1 + P + \lambda \leq d'_n \leq P + q_1 + r_2 \quad (22)$$

As the only variable component of $d'_n$ is the queuing delay, Equation (22) states that the queuing delay varies from between the values of $\lambda$ d $r_2$. This can be rewritten as:

$$\text{Queuing Delay} \leq r_2 - \lambda \quad (23)$$

Thus Equation (6b) is also satisfied.

If a path can be found such that:

$$P + Q \leq c_1; \text{ and} \quad (24a)$$

$$P + 2Q \leq c_1 + c_2 \quad (24b)$$

it may be shown that such a path also satisfies Equations (5a) and (5b), such that a buffer 120 may be provided to increase the allowable queuing delay at the expense of an increase in the total delay. If in the case of a path which satisfies Equations (24a) and (24b), $Q \leq c_2$, both delay requirements of Equations (2a) and (2b) are satisfied. Alternatively, if $Q > c_2$ we set $\lambda = Q - c_2$ and use a buffer 120 at the destination. By adding the buffer 120, we know from Equations (6a) and (6b) that:

$$\text{Total Delay} \leq P + Q + \lambda \quad (25a)$$

$$\text{Queuing Delay} \leq Q - \lambda \quad (25b)$$

Equations (25a) and (25b) establish that Equations (2a) and (2b) are satisfied, as:

$$\text{Queuing Delay} \leq Q - \lambda = Q - (Q - c_2) = c_2 \quad (26a)$$

$$\text{Total Delay} \leq P + Q + \lambda = P + 2Q - c_2 \leq c_1 \quad (26b)$$

This demonstrates that paths which satisfy Equations (24a) and (24b) will also satisfy Equations (2a) and (2b).

Figure 6:
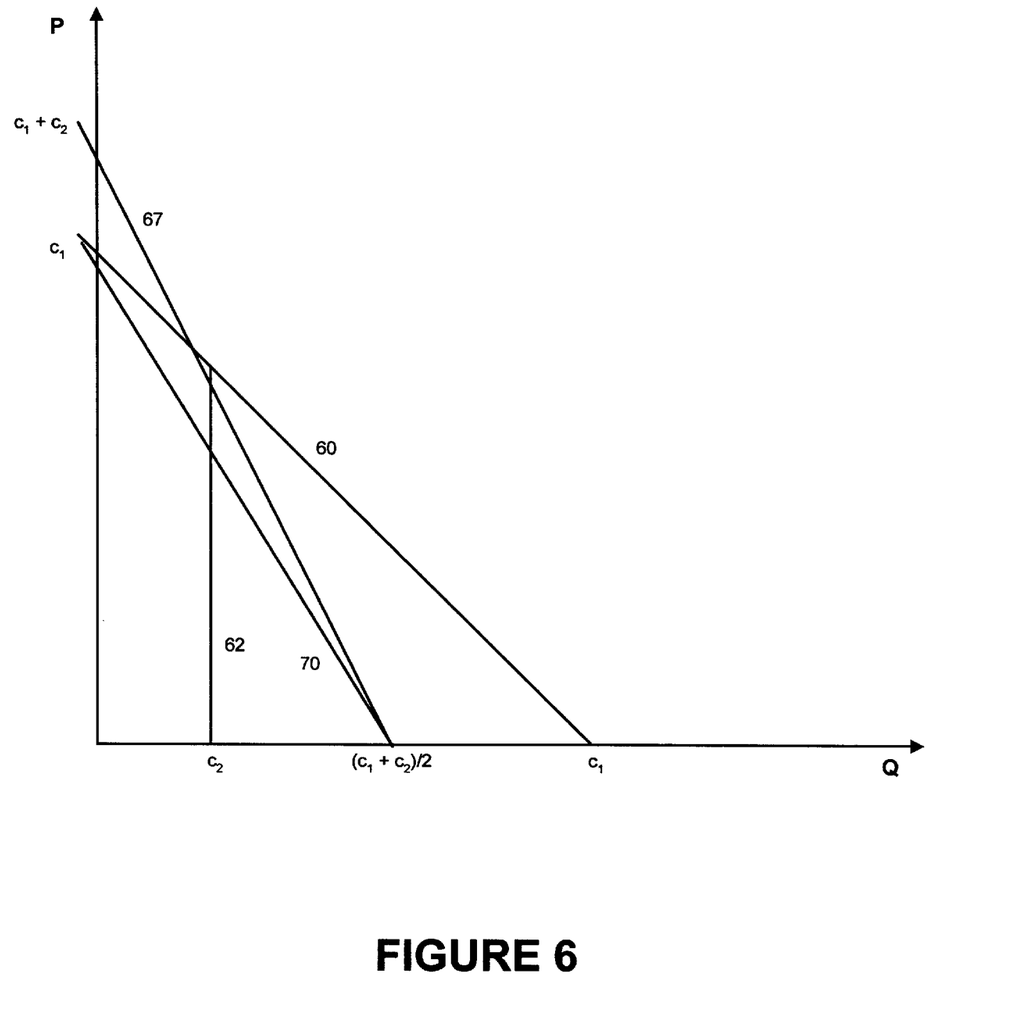
FIG. 6 is a graphical representation of the propagation delay versus the queuing delay that illustrates aspects of a mathematical proof.

In the graph of FIG. 6, Equation (24a) is plotted as line 60 and Equation (24b) is plotted as line 67. As can be seen from the figure, any point falling below line 70 will by definition also satisfy Equations (24a) and (24b) since line 70 falls below lines 60 and 67. Line 70 may mathematically be described as:

$$2c_1 Q + (c_1 + c_2) P = c_1(c_1 + c_2) \quad (27)$$

Thus, pursuant to the teachings of the present invention, it is understood that, if an output buffer 120 is provided, any path which satisfies the inequality of Equation (27) will also satisfy the dual delay requirements of Equations (2a) and (2b). As shown in FIG. 3, paths which satisfy the inequality of Equation (27) are identified by calculating the contribution of link i to the total delay "cost" as $2c_1 q_i + (c_1 + c_2) p_i$ (block 30) and comparing the total cost of the various network routing paths to the maximum allowable total of $c_1(c_1 + c_2)$ (block 34 and block 36).

While the second embodiment of the present invention preferably includes a buffer 120 at the destination node, those of skill in the art will recognize that it is typically a simple to provide a buffer 120 at a certain destination node (as opposed to changing the size of a network "playout" buffer, which typically may not be simple). Accordingly, in almost every case where constant bit rate traffic is involved, it is possible to use the second embodiment of the present invention to identify network routing paths which satisfy two separate delay requirements.

Figure 7:
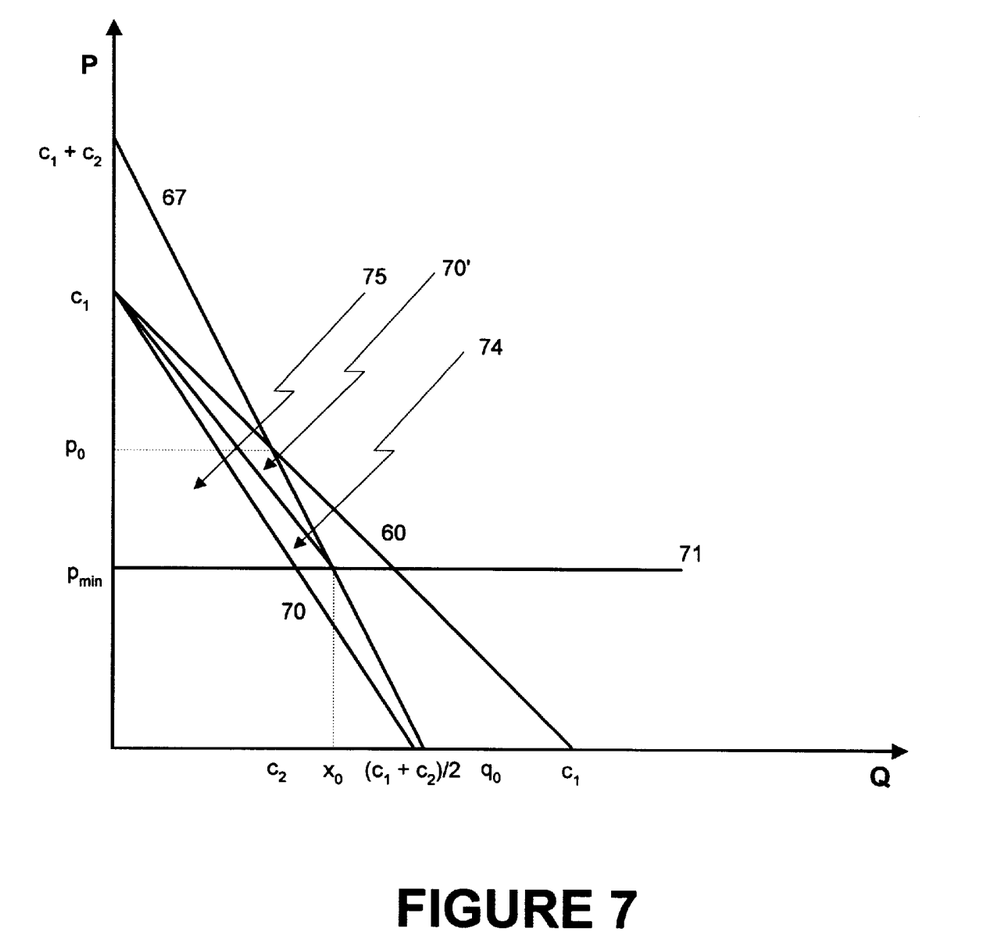
FIG. 7 is a graphical representation of the propagation delay versus the queuing delay illustrating the additional region which can be searched if the minimum propagation delay is known.

As shown in FIG. 3, in a third embodiment of the present invention, it is possible to further increase the probability of identifying a routing path satisfying the dual delay requirements of Equations (2a) and (2b) if the minimum propagation time ($p_{min}$) between the source and destination node is known (block 14). In this situation, there is no need to search the region of FIGS. 4–6 where $P < p_{min}$ to find acceptable paths, as no such paths will be found. Thus, as shown in FIG. 7, line 70 may be redrawn as line 70' so that it extends from the point $(0, c_1)$ to the point where the line $P = p_{min}$ (line 71) intersects line 67. This latter point has coordinates $(x_0, p_{min})$, where:

$$x_0 = (c_1 + c_2)(c_1 - p_{min})/2c_1 \quad (28)$$

From the graph of FIG. 7, it may be seen that the triangle 74 formed by line 70', the P axis, and the line $P=p_{min}$ (line 71) falls entirely within the trapezoidal region 75 of FIG. 7 which illustrates where paths satisfying the criteria of Equations (2a) and (2b) may lie. Accordingly, any point falling below line 70 will satisfy Equations (24a) and (24b). Thus, pursuant to the teachings of the present invention, it is understood that any path which satisfies the inequality of Equation (28) will also satisfy the dual delay requirements of Equations (2a) and (2b). This is accomplished in the third embodiment illustrated in blocks 40, 42, 44, 46, 48 of FIG. 3 by calculating the contribution of link i to the total delay "cost" as $(c_1-p_{min})q_i+x_0p_i$ and comparing the total cost of the various network routing paths to the maximum allowable total of $c_1x_0$. Those of skill in the art will also understand that the actual value of the minimum propagation delay need not be used, as it is sufficient that a value be used which is less than or equal to $p_{min}$. However, from FIG. 7 it is clear that improved performance may be obtained the larger the value used, so it is typically preferable to use the actual value of $p_{min}$.

In light of the above, those of skill in the art will understand that Equation (28) provides another means for reducing the dual delay requirement of Equations (2a) and (2b) to a single delay requirement. In using the criteria of Equation (28), it is preferred that the communication be a constant bit rate communication, that an output buffer 120 be provided, and that the minimum propagation time between the source and the destination be known.

While the present invention has principally been described with respect to delay criteria, those of skill in the art will understand that the present invention may be utilized with any performance criteria susceptible to characterization in the same manner as delay (i.e., where all criteria have a common unit of measure). Accordingly, the present invention should not be construed as limited to delay criteria.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method for identifying from a plurality of network routing paths a network routing path having a value for a first delay characteristic which is less than a first specified limit and a value for a second delay characteristic which is less than a second specified limit, the method comprising the steps of:

determining a value for a third delay characteristic associated with one of the plurality of routing paths; and determining if the determined value for the third delay characteristic associated with the one of the plurality of routing paths is less than a third specified limit associated with the third delay characteristic, wherein the third delay characteristic differs from both the first and the second delay characteristics and operates as a proxy for the first and second delay characteristics.

2. The method according to claim 1, wherein the third delay characteristic is selected such that if the value for the third delay characteristic associated with the one of the plurality of routing paths is less than the third specified limit, then the value for the first delay characteristic associated with the one of the plurality of routing paths will be less than the first specified limit and the value for the second delay characteristic associated with the one of the plurality of routing paths will be less than the second specified limit.

3. A method for selecting a network routing path from a plurality of routing paths, wherein each of the routing paths in the plurality of routing paths consists of at least one transmission link having an associated first and second variable, the method comprising the steps of:

calculating a cost associated with each of said transmission links in one of the plurality of routing paths as a first product of a first specified limit and the second variable associated with the transmission link added to a second product of a second specified limit and the first variable associated with the transmission link;

determining a total cost associated with the one of the plurality of routing paths wherein the total cost is a sum of the costs associated with each of said transmission links in the one of the plurality of routing paths; and selecting the one of the plurality of routing paths if the total cost for the selected routing path is less than a third product of the first specified limit and the second specified limit.

4. The method of claim 3, wherein:

the first variable is a propagation delay associated with the transmission link;

the second variable is a queuing delay associated with the transmission link;

the first specified limit is a maximum allowable total transmission delay; and the second specified limit is a maximum allowable queuing delay.

5. The method of claim 4, wherein the total cost is determined via the Network Broadband Services architecture path selection methodology based on the cost associated with each of said transmission links calculated in said calculating step.

6. A method for selecting a network routing path for a constant bit rate digital communication from a plurality of routing paths, wherein each of the routing paths in the plurality of routing paths consists of at least one transmission link having an associated first and second variable, the method comprising the steps of:

calculating a cost associated with each of said transmission links in one of the plurality of routing paths as twice a first product of a first specified limit and the second variable associated with the transmission link, added to a second product of the first variable associated with the transmission link with a sum of the first specified limit and a second specified limit;

determining a total cost associated with the one of the plurality of routing paths wherein the total cost is a second sum of the costs associated with each of said transmission links in the one of the plurality of routing paths; and selecting the one of the plurality of routing paths if the total cost for the selected routing path is less than a square of the first specified limit added to a third product of the first specified limit and the second specified limit.

7. The method of claim 6, wherein:

the first variable is a propagation delay associated with the transmission link;

the second variable is a queuing delay associated with the transmission link;

the first specified limit is a maximum allowable total transmission delay; and the second specified limit is a maximum allowable queuing delay.

8. A method according to claim 7, wherein the total cost is determined via the Network Broadband Services architecture path selection methodology based on the cost associated with each of said transmission links calculated in said calculating step.

9. A method for selecting a network routing path for a constant bit rate digital communications signal from a plurality of routing paths, wherein each of the routing paths in the plurality of routing paths consists of at least one transmission link having an associated first and second variable, the method comprising the steps of:

selecting a specified value which is less than or equal to a minimum possible propagation delay between a source and a destination of the digital communications signal;

calculating a cost associated with each of said transmission links in one of the plurality of routing paths as a first product of the second variable associated with the transmission link with a first difference between a first specified limit and the specified value, added to a second product of the first variable associated with the transmission link with $x_0$, wherein $x_0$ is a third product of a first sum of the first specified limit and a second specified limit with a second difference of the first specified limit and the specified value divided by twice the first specified limit;

determining a total cost associated with the one of the plurality of routing paths wherein the total cost is a second sum of the costs associated with each of said transmission links in the one of the plurality of routing paths; and selecting the one of the plurality of routing paths if the total cost for the selected routing path is less than a fourth product of the first specified limit and $x_o$.

10. The method of claim 9, wherein:

the first variable is a propagation delay associated with the transmission link;

the second variable is a queuing delay associated with the transmission link;

the first specified limit is a maximum allowable total transmission delay; and the second specified limit is a maximum allowable queuing delay.

11. A method according to claim 10, wherein the total cost is determined via the Network Broadband Services architecture path selection methodology based on the transmission link costs calculated in said calculating step.

12. A system for identifying from a plurality of network routing paths a network routing path having a value for a first delay characteristic which is less than a first specified limit and a value for a second delay characteristic which is less than a second specified limit the system comprising:

means for determining a value for a third delay characteristic associated with one of the plurality of routing paths; and means for determining if the determined value for the third delay characteristic associated with the one of the plurality of routing paths is less than a third specified limit associated with the third delay characteristic, wherein the third delay characteristic differs from both the first and the second delay characteristics and Operates as a proxy for the first and second delay characteristics.

13. The system according to claim 12, wherein the third delay characteristic is selected such that if the value for the third delay characteristic associated with one of the plurality of routing paths is less than the third specified limit, then the value for the first delay characteristic associated with the one of the plurality of routing paths will be less than the first specified limit and the value for the second delay characteristic associated with the one of the plurality of routing paths will be less than the second specified limit.

14. A system for selecting a network routing path from a plurality of routing paths, wherein each of said routing paths in said plurality of routing paths consists of at least one transmission link having an associated first and second variable, comprising:

means for calculating a cost associated with each of said transmission links in one of the plurality of routing paths as a first product of a first specified limit and said second variable associated with the transmission link added to a second product of a second specified limit and said first variable associated with the transmission link;

means for determining a total cost associated with said one of the plurality of routing paths wherein said total cost is a sum of said costs associated with each of said transmission links in said one of the plurality of routing paths; and means for selecting said one of the plurality of routing paths if the total cost for the selected routing path is less than a third product of said first specified limit and said second specified limit.

15. A system according to claim 14, wherein:

said first variable is a propagation delay associated with the transmission link;

said second variable is a queuing delay associated with the transmission link;

said first specified limit is a maximum allowable total transmission delay; and said second specified limit is a maximum allowable queuing delay.

16. A system according to claim 15, wherein the means for determining said total cost comprises means for performing the Network Broadband Services architecture path selection methodology.

17. A system for selecting a network routing path for a constant bit rate digital communication from a plurality of routing paths, wherein each of said routing paths in said plurality of routing paths consists of at least one transmission link having an associated first and second variable, comprising:

means for calculating a cost associated with each of said transmission links in one of the plurality of routing paths as twice a first product of a first specified limit and said second variable associated with the transmission link added to a second product of said first variable associated with the transmission link with a first sum of said first specified limit and a second specified limit;

means for determining a total cost associated with said one of the plurality of routing paths wherein said total cost is a second sum of said costs associated with each of said transmission links in said one of the plurality of routing paths; and means for selecting said one of the plurality of routing paths if the total cost for the selected routing path is less than a square of said first specified limit added to a third product of said first specified limit and said second specified limit.

18. A system according to claim 17, wherein:

said first variable is a propagation delay associated with the transmission link;

said second variable is a queuing delay associated with the transmission link;

said first specified limit is a maximum allowable total transmission delay; and said second specified limit is a maximum allowable queuing delay.

19. A system according to claim 18, wherein the means for determining said total cost comprise means for performing the Network Broadband Services architecture path selection methodology.

20. A system for selecting a network routing path for a constant bit rate digital communications signal from a plurality of routing paths, wherein each of said routing paths in said plurality of routing paths consists of at least one transmission link having an associated first and second variable, comprising:

means for selecting a specified value which is less than or equal to a minimum possible propagation delay between a source and a destination of the digital communications signal;

means for calculating a cost associated with each of said transmission links in one of the plurality of routing paths as a first product of said second variable associated with the transmission link with a first difference between a first specified limit and said specified value, added to a second product of said first variable associated with the transmission link with $x_0$, wherein $x_0$ is a third product of a first sum of said first specified limit and a second specified limit with a second difference of said first specified limit and said specified value divided by twice said first specified limit;

means for determining a total cost associated with said one of the plurality of routing paths wherein said total cost is a second sum of said costs associated with each of said transmission links in said one of the plurality of routing paths; and means for selecting said one of the plurality of routing paths if the total cost for the selected routing path is less than a fourth product of said first specified limit and $x_0$.

21. A system according to claim 20, wherein:

said first variable is a propagation delay associated with the transmission link;

said second variable is a queuing delay associated with the transmission link;

said first specified limit is a maximum allowable total transmission delay; and said second specified limit is a maximum allowable queuing delay.

22. A system according to claim 21, wherein the means for determining said total cost comprise means for performing the Network Broadband Services architecture path selection methodology.

23. A computer program product for identifying from a plurality of network routing paths a network routing path having a value for a first delay characteristic which is less hn a first specified limit and a value for a second delay characteristic which is less than a second specified limit, the computer program product comnprising:

a computer-readable storage medium having computer-readable program code means embodied in said medium, said computer-readable program code means comprising:

computer-readable program code means for determining a value for a third delay characteristic associated with one of the plurality of routing paths; and computer-readable program code means for determining if the determined value for the third delay characteristic associated with the one of the plurality of routing paths is less than a third specified limit associated with the third delay characteristic, wherein the third delay characteristic differs from both the first and the second delay characteristics and operates as a proxy for the first and second delay characteristics.

24. The computer program product according to claim 23, wherein the third delay characteristic is selected such that if the value for the third delay characteristic associated with one of the plurality of routing paths is less than the third specific limit, then the value for the first delay characteristic associated with the one of the plurality of routing paths will be less than the first specified limit and the value for the second delay characteristic associated with the one of the plurality of routing paths will be less than the second specified limit.

25. A computer program product for selecting a network routing path from a plurality of routing paths, wherein each of said routing paths in said plurality of routing paths consists of at least one transmission link having an associated first and second variable, the computer program product comprising:

a computer-readable storage medium having computer-readable program code means embodied in said medium, said computer-readable program code means comprising:

computer-readable program code means for calculating a cost associated with each of said transmission links in one of the plurality of routing paths as a first product of a first specified limit and said second variable associated with the transmission link added to a second product of a second specified limit and said first variable associated with the transmission link;

computer-readable program code means for determining a total cost associated with said one of the plurality of routing paths wherein said total cost is a sum of said costs associated with each of said transmission links in said one of the plurality of routing paths; and computer-readable program code means for selecting said one of the plurality of routing paths if the total cost for the selected routing path is less than a third product of said first specified limit and said second specified limit.

26. A computer program product according to claim 25, wherein:

said first variable is a propagation delay associated with the transmission link;

said second variable is a queuing delay associated with the transmission link;

said first specified limit is a maximum allowable total transmission delay; and said second specified limit is a maximum allowable queuing delay.

27. A computer program product according to claim 26, wherein the computer-readable program code means for determining said total cost comprise computer-readable program code means for performing the Network Broadband Services architecture path selection methodology.

28. A computer program product for selecting a network routing path for a constant bit rate digital communication from a plurality of routing paths, wherein each of said routing paths in said plurality of routing paths consists of at least one transmission link having an associated first and second variable, the computer program product comprising:

a computer-readable storage medium having computer-readable program code means embodied in said medium, said computer-readable program code means comprising:

computer-readable program code means for calculating a cost associated with each of said transmission links in one of the plurality of routing paths as twice a first product of a first specified limit and said second variable associated with the transmission link added to a second product of said first variable associated with the transmission link with a first sum of said first specified limit and a second specified limit;

computer-readable program code means for determining a total cost associated with said one of the plurality of routing paths wherein said total cost is a second sum of said costs associated with each of said transmission links in said one of the plurality of routing paths; and computer-readable program code means for selecting said one of the plurality of routing paths if the total cost for the selected routing path is less than a square of said first specified limit added to a third product of said first specified limit and said second specified limit.

29. A computer program product according to claim 28, wherein:

said first variable is a propagation delay associated with the transmission link;

said second variable is a queuing delay associated with the transmission link;

said first specified limit is a maximum allowable total transmission delay; and said second specified limit is a maximum allowable queuing delay.

30. A computer program product according to claim 29, wherein the computer-readable program code means for determining said total cost comprise computer-readable program code means for performing the Network Broadband Services architecture path selection methodology.

31. A computer program product for selecting a network routing path for a constant bit rate digital communications signal from a plurality of routing paths, wherein each of said routing paths in said plurality of routing paths consists of at least one transmission link having an associated first and second variable, the computer program product comprising:

a buffer;

a computer-readable storage medium having computer-readable program code means embodied in said medium, said computer-readable program code means comprising:

computer-readable program code means for selecting a specified value which is less than or equal to a minimum possible propagation delay between a source and a destination of the digital communications signal;

computer-readable program code means for calculating a cost associated with each of said transmission links in one of the plurality of routing paths as a first product of said second variable associated with the transmission link with a first difference between a first specified limit and said specified value added to a second product of said first variable associated with the transmission link with $x_0$, wherein $x_0$ is a third product of a first sum of said first specified limit and a second specified limit with a second difference of said first specified limit and said specified value divided by twice said first specified limit;

computer-readable program code means for determining a total cost associated with said one of the plurality of routing paths wherein said total cost is a second sum of said costs associated with each of said transmission links in said one of the plurality of routing paths; and computer-readable program code means for selecting said one of the plurality of routing paths if the total cost for the selected routing path is less than a fourth product of said first specified limit and $x_0$.

32. A computer program product according to claim 31, wherein:

said first variable is a propagation delay associated with the transmission link;

said second variable is a queuing delay associated with the transmission link;

said first specified limit is a maximum allowable total transmission delay; and said second specified limit is a maximum allowable queuing delay.

33. A computer program product according to claim 32, wherein the computer-readable program code means for determining said total cost comprise computer-readable program code means for performing the Network Broadband Services architecture path selection methodology.

* * * * *